United States Patent
Lehtimaki (10) Patent No.: US 11,143,735 B2
(45) Date of Patent: Oct. 12, 2021

(54) PSEUDO-SPECTRUM AVERAGING FOR ANGLE OF ARRIVAL DETECTION

(71) Applicant: Silicon Laboratories Inc., Austin, TX (US)

(72) Inventor: Sauli Johannes Lehtimaki, Nummela (FI)

(73) Assignee: Silicon Laboratories, Inc., Austin, TX (US)

( * ) Notice: Subject to any disclaimer, the term of this patent is extended or adjusted under 35 U.S.C. 154(b) by 207 days.

(21) Appl. No.: 16/229,105

(22) Filed: Dec. 21, 2018

(65) Prior Publication Data

US 2020/0200852 A1 Jun. 25, 2020

(51) Int. Cl.
| | | |
|---|---|---|
| *G01S 3/48* | (2006.01) | |
| *G01S 3/46* | (2006.01) | |
| *H04B 7/08* | (2006.01) | |
| *H04B 1/7156* | (2011.01) | |
| *G01S 3/00* | (2006.01) | |

(52) U.S. Cl.
CPC ............... *G01S 3/48* (2013.01); *G01S 3/465* (2013.01); *H04B 1/7156* (2013.01); *H04B 7/0897* (2013.01); *H04B 2001/71563* (2013.01)

(58) Field of Classification Search
CPC ........ G01S 3/48; G01S 3/465; G01S 15/8915; G01S 15/8977; G01S 13/42; G01S 13/584; G01S 3/74; G01S 5/02; H04B 7/0897; H04B 1/7156; H04B 2001/71563; H04L 25/0204
See application file for complete search history.

(56) References Cited

U.S. PATENT DOCUMENTS

| | | | | |
|---|---|---|---|---|
| 7,804,445 B1* | 9/2010 | Fiore | ...................... | G01S 13/42 |
| | | | | 342/90 |
| 9,955,943 B2* | 5/2018 | Huang et al. | ....... | G01S 13/8915 |
| 9,955,944 B2* | 5/2018 | Huang | ................ | G01S 15/8977 |
| 10,327,221 B1* | 6/2019 | Sarrigeorgidis | .... | H04L 25/0204 |
| 10,466,345 B1* | 11/2019 | Sarrigeorgidis | .......... | G01S 5/02 |
| 2003/0052820 A1* | 3/2003 | Ferreol | ..................... | G01S 3/74 |
| | | | | 342/441 |

(Continued)

OTHER PUBLICATIONS

Gupta et al., "MUSIC and Improved MUSIC Algorithm to Estimate Direction of Arrival", 2015 IEEE International Conference on Communications and Signal Processing (ICCSP), 2015.

(Continued)

*Primary Examiner* — Bernarr E Gregory
(74) *Attorney, Agent, or Firm* — Nields, Lemack & Frame, LLC (57) ABSTRACT

A system and method for determining a direction of arrival of an incoming signal is disclosed. The present system utilizes a plurality of pseudo-spectrums to create a more accurate result matrix. The pseudo-spectrums are one or two dimensional arrays, where peaks in the arrays are indicative of the angle of arrival. A result matrix is generated by performing a mathematical operation of corresponding elements in each pseudo-spectrum. This mathematical operation may be addition or multiplication. The result matrix provides a more accurate indication of the angle of arrival than can otherwise by achieved. In some embodiments, a measure of quality may also be calculated for the result matrix.

20 Claims, 11 Drawing Sheets

(56) References Cited

U.S. PATENT DOCUMENTS

| | | | | |
|---|---|---|---|---|
| 2003/0063029 A1* | 4/2003 | Ferreol | ................. | G01S 3/48 342/440 |
| 2007/0147482 A1* | 6/2007 | Shirai | ................. | G01S 3/48 375/148 |
| 2008/0266177 A1* | 10/2008 | Chevalier | ................. | G01S 3/74 342/417 |
| 2008/0316090 A1* | 12/2008 | Shirakawa | ................. | G01S 13/584 342/195 |
| 2009/0073041 A1* | 3/2009 | Ferreol | ................. | G01S 3/74 342/441 |
| 2011/0001659 A1* | 1/2011 | Hampel | ................. | G01S 3/74 342/120 |
| 2020/0309891 A1 | 10/2020 | Kauppo et al. | | |

OTHER PUBLICATIONS

Wu et al., "Two-Dimensional Direction-of-Arrival Estimation for Co-Prime Planar Arrays: A Partial Spectral Search Approach", IEEE Sensors Journal, vol. 16, No. 14, pp. 5660-5670, Jul. 15, 2016.
The Examiner's attention is drawn to co-pending U.S. Appl. No. 16/364,482, filed Mar. 26, 2019 by Kauppo et al., and the Office actions and references cited therein.

* cited by examiner

PSEUDO-SPECTRUM AVERAGING FOR ANGLE OF ARRIVAL DETECTION

FIELD

This disclosure describes systems and methods for determining the angle of arrival of an incoming signal, and specifically, using averaging of multiple pseudo-spectrums to improve the accuracy of this determination.

BACKGROUND

Algorithms for determining the direction of arrival of an incoming wireless signal are well known. These algorithms exploit the difference in phase of the incoming signal at a plurality of antenna elements. For example, a linear antenna array can be formed, where the spacing between adjacent antenna elements is constant. As the incoming signal is received, it will reach the antenna element located closest to the transmitter first. The incoming signal will then reach the other antenna elements in the antenna array based on their distance to the transmitter.

Using the difference in phase, the direction of the transmitter can be estimated. Direction of arrival is important in various applications, such as beacon location, or spatial positioning.

However, existing algorithms have limitations. For example, in a heavy multipath environment, the pseudo-spectrum used for direction of arrival estimation often has multiple peaks and the desired line-of-sight signal do not always produce the highest peaks on the pseudo-spectrum. Changes in signal frequency, a slight movement of the tracked device in the multipath environment or noise in the process can cause the algorithm to produce drastically different pseudo-spectrums for a comparatively static situation.

Consequently, an improved system and method would be beneficial. Further, it would be advantageous if the improved system did not require a large amount of computational processing.

SUMMARY

A system and method for determining a direction of arrival of an incoming signal is disclosed. The present system utilizes a plurality of pseudo-spectrums to create a more accurate result matrix. The pseudo-spectrums are one or two dimensional arrays, where peaks in the arrays are indicative of the angle of arrival. A result matrix is generated by performing a mathematical operation of corresponding elements in each pseudo-spectrum. This mathematical operation may be addition or multiplication. The result matrix provides a more accurate indication of the angle of arrival than can otherwise by achieved. In some embodiments, a measure of quality may also be calculated for the result matrix.

According to one embodiment, a method of improving the accuracy of an angle of arrival or an angle of departure algorithm is disclosed. The method comprises executing the angle of arrival or angle of departure algorithm a plurality of times so as to create a plurality of pseudo-spectrums, wherein the pseudo-spectrums comprise one or two dimensional arrays; performing a mathematical operation on the plurality of pseudo-spectrums to produce a result matrix; and determining the angle of arrival or angle of departure based on the result matrix. In certain embodiments, the mathematical operation comprises adding corresponding elements from each of the plurality of pseudo-spectrums to form the result matrix. In a further embodiment, the method comprises determining a measure of quality. In one embodiment, the method further comprises normalizing the result matrix by dividing each element in the result matrix by the largest value contained in the result matrix to form a normalized result matrix; and adding all of the elements of the normalized result matrix together to generate an integral; wherein the integral is indicative of the accuracy of the angle of arrival or angle of departure algorithm. In certain embodiments, the mathematical operation comprises multiplying corresponding elements from each of the plurality of pseudo-spectrums to form the result matrix. In some embodiments, the plurality of pseudo-spectrums are acquired at a plurality of different frequencies. In certain embodiments, the angle of arrival or angle of departure is used to perform wayfinding. In certain embodiments, the angle of arrival or angle of departure is used to perform spatial positioning. In some embodiments, the angle of arrival or angle of departure algorithm continuously generates pseudo-spectrums and the result matrix is generated using a rolling average.

According to another embodiment, a locator device is disclosed. The locator device comprises an antenna array, arranged as a one or two dimensional array; a wireless receiver in communication with the antenna array; a processing unit; and a memory device in communication with the processing unit, comprising instructions, which when executed by the processing unit, enable the locator device to: generate a plurality of pseudo-spectrums based on incoming signals received by the wireless receiver, using an angle of arrival algorithm; perform a mathematical operation on the plurality of pseudo-spectrums to create a result matrix; and determine an angle of arrival from the result matrix, wherein the mathematical operation improves the accuracy of the angle of arrival algorithm. In certain embodiments, the mathematical operation comprises adding corresponding elements from each of the plurality of pseudo-spectrums to form the result matrix. In a further embodiment, the method comprises determining a measure of quality. In certain embodiments, the instructions, when executed by the processing unit, enable the locator device to: normalize the result matrix by dividing each element in the result matrix by the largest value contained in the result matrix to form a normalized result matrix; and add all of the elements of the normalized result matrix together to generate an integral; wherein the integral is indicative of the accuracy of the angle of arrival algorithm. In certain embodiments, the mathematical operation comprises multiplying corresponding elements from each of the plurality of pseudo-spectrums to form the result matrix. In some embodiments, the plurality of pseudo-spectrums are acquired at a plurality of different frequencies. In certain embodiments, the locator device comprises an indicator to inform an operator of the angle of arrival.

According to another embodiment, a device is disclosed. The device comprises an antenna; a wireless receiver in communication with the antenna; a processing unit; and a memory device in communication with the processing unit, comprising instructions, which when executed by the processing unit, enable the device to: generate a plurality of pseudo-spectrums based on incoming signals received by the wireless receiver, using an angle of departure algorithm; perform a mathematical operation on the plurality of pseudo-spectrums to create a result matrix; and determine an angle of departure from the result matrix, wherein the mathematical operation improves the accuracy of the angle of departure algorithm. In certain embodiments, the device comprises an indicator to inform an operator of the angle of departure. In certain embodiments, the device comprises an indicator to inform an operator of its spatial position.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
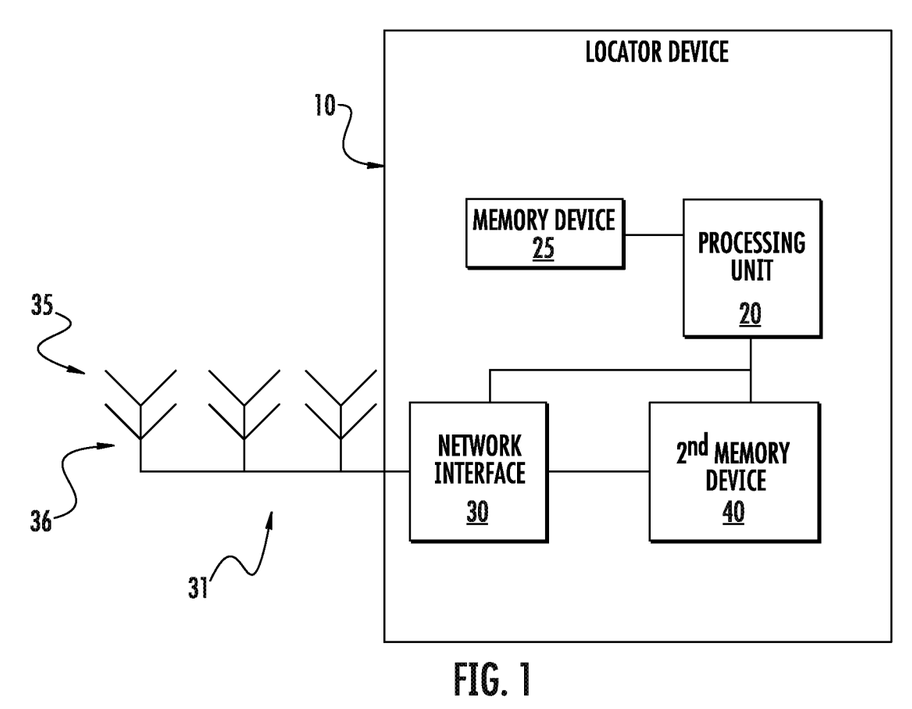
FIG. 1 is a block diagram of a representative locator device that may estimate angle of arrival according to one embodiment.
Figure 10:
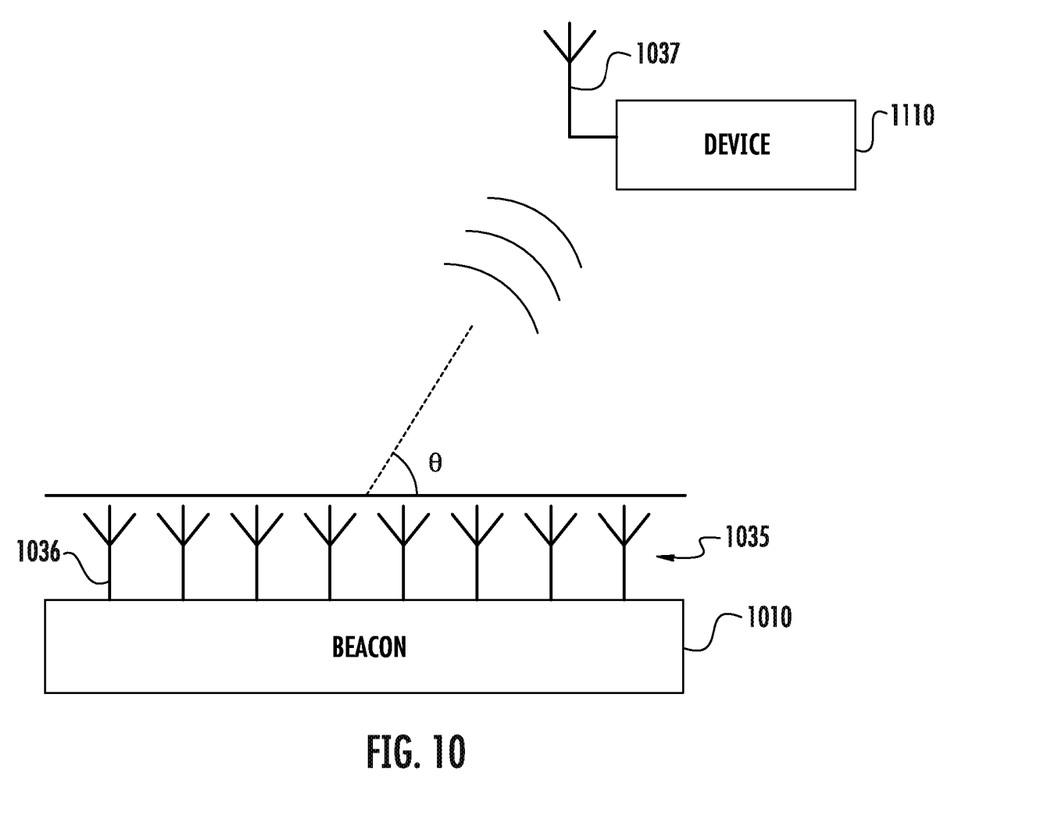
FIG. 10 shows a network having a beacon and a device according to one embodiment.

FIG. 1 shows a block diagram of a representative network device. This network device may serve as a locator device 10, as described in more detail below. This network device may also be used to determine angle of departure, as shown in FIG. 10.

The locator device 10 has a processing unit 20 and an associated memory device 25. The processing unit 20 may be any suitable component, such as a microprocessor, embedded processor, an application specific circuit, a programmable circuit, a microcontroller, or another similar device. This memory device 25 contains the instructions, which, when executed by the processing unit 20, enable the locator device 10 to perform the functions described herein. This memory device 25 may be a non-volatile memory, such as a FLASH ROM, an electrically erasable ROM or other suitable devices. In other embodiments, the memory device 25 may be a volatile memory, such as a RAM or DRAM.

The locator device 10 also includes a network interface 30, which may be a wireless interface including an antenna array 35.

The antenna array 35 comprises a plurality of antenna elements 36, which are arranged in a fixed, known pattern. For example, in one embodiment, the antenna array 35 may comprises a plurality of antenna elements 36 arranged in a linear fashion. In one embodiment, the same spacing is established between any two adjacent antenna elements 36. In another embodiment, the antenna elements 36 may be arranged as a two dimensional array or a three dimensional array. In one further embodiment, the spacing between any two adjacent antenna elements 36 in one direction is the same. In certain embodiments, the spacing between antenna elements 36 is related to the transmitted and received wavelengths. For example, the spacing between adjacent antenna elements 36 may be a half wavelength or less. The number of antenna elements 36 in the antenna array 35 is not limited by this disclosure. Further, the type of antenna array is not limited, and may be, for example, a uniform linear array (ULA), a uniform rectangular array (URA), a uniform circular array (UCA) or any other type.

The wireless signals first enter the network interface 30 through antenna array 35. The antenna array 35 is in electrical communication with a low noise amplifier (LNA). In certain embodiments, an analog switch may be used to select one of the antenna elements 36 to communicate with the LNA. The LNA receives a very weak signal from one antenna element 36 in the antenna array 35 and amplifies that signal while maintaining the signal-to-noise ratio (SNR) of the incoming signal. The amplified signal is then passed to a mixer. The mixer is also in communication with a local oscillator, which provides two phases to the mixer. The cosine of the frequency may be referred to as $I_o$, while the sin of the frequency may be referred to as $Q_o$. The $I_o$ signal is then multiplied by the incoming signal to create the inphase signal, $I_m$. The $Q_o$ signal is then multiplied by a 90° delayed version of the incoming signal to create the quadrature signal, $Q_m$. The inphase signal, $I_m$, and the quadrature signal, $Q_m$, from the mixer are then fed into programmable gain amplifier (PGA). The PGA amplifies the $I_m$ and $Q_m$ signals by a programmable amount. These amplified signals may be referred to as $I_g$ and $Q_g$. The amplified signals, $I_g$ and $Q_g$, are then fed from the PGA into an analog to digital converter (ADC). The ADC converts these analog signals to digital signals, $I_d$ and $Q_d$. These digital signals may then pass through a channel filter. The filtered signals are referred to as I and Q. These I and Q signals can be used to recreate the amplitude and phase of the original signal. The analog switch may then be switched so as to select a different one of the antenna elements 36 so that the above process may be repeated for each antenna element 36. In certain embodiments, rather than utilizing an analog switch, the network interface may comprise a plurality of LNAs, mixers, PGAs and ADCs, so that the signals from all of the antenna elements 36 can be processed simultaneously.

The network interface 30 may support any wireless network, such as BLUETOOTH® protocol, Wi-Fi, networks utilizing the IEEE 802.15.4 specification, such as ZIGBEE® protocol, networks utilizing the IEEE 802.15.6 specification, and wireless smart home protocols, such as Z-Wave. The network interface 30 is used to allow the locator device to communicate with other devices disposed on the network 31.

The locator device 10 may include a second memory device 40 in which data that is received and transmitted by the network interface 30 is stored. This second memory device 40 is traditionally a volatile memory. The processing unit 20 has the ability to read and write the second memory device 40 so as to communicate with the other nodes in the network 31. Although not shown, the locator device 10 also has a power supply, which may be a battery or a connection to a permanent power source, such as a wall outlet.

While a memory device 25 is disclosed, any computer readable medium may be employed to store these instructions. For example, read only memory (ROM), a random access memory (RAM), a magnetic storage device, such as a hard disk drive, or an optical storage device, such as a CD or DVD, may be employed. Furthermore, these instructions may be downloaded into the memory device 25, such as for example, over a network connection (not shown), via CD ROM, or by another mechanism. These instructions may be written in any programming language and is not limited by this disclosure. Thus, in some embodiments, there may be multiple computer readable media that contain the instructions described herein. The first computer readable media may be in communication with the processing unit 20, as shown in FIG. 1. The second computer readable media may be a CDROM, or a different memory device, which is located remote from the locator device 10. The instructions contained on this second computer readable media may be downloaded onto the memory device 25 to allow execution of the instructions by the locator device 10.

While the processing unit 20, the memory device 25, the network interface 30, and the second memory device 40 are shown in FIG. 1 as separate components, it is understood that some or all of these components may be integrated into a single electronic component. Rather, FIG. 1 is used to illustrate the functionality of the locator device 10, not its physical configuration.

Figure 2:
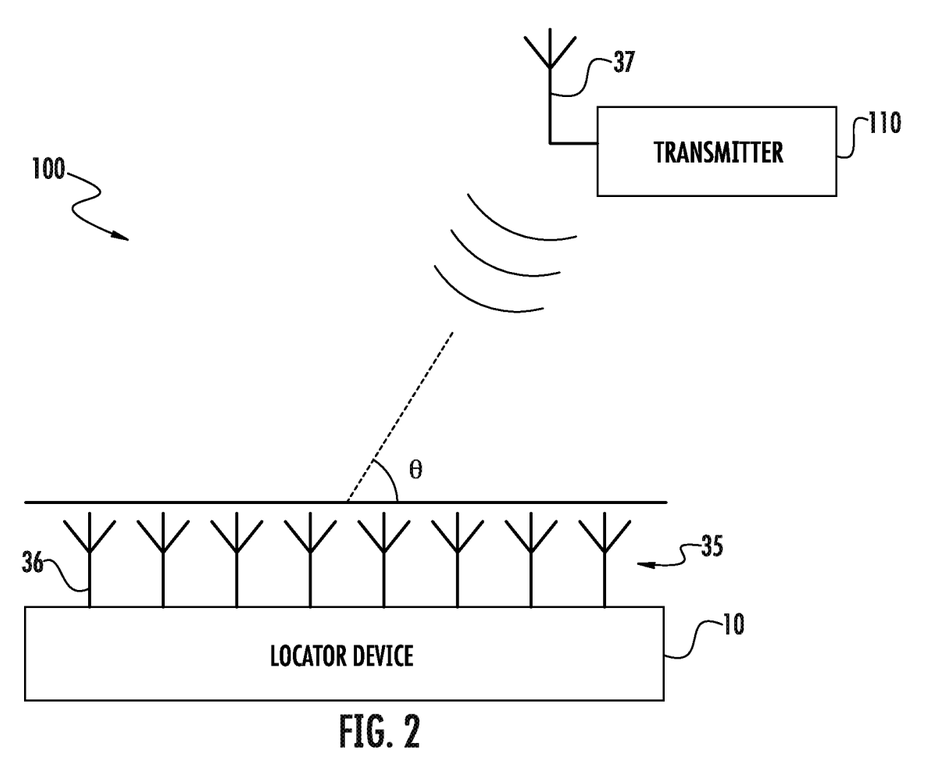
FIG. 2 shows a network having a locator device and at least one transmitter according to one embodiment.

FIG. 2 shows a network 100 having at least one transmitter 110 and a locator device 10. In certain embodiments, the transmitter 110 may be a network device and contain many of the components described above and shown in FIG. 1. However, the transmitter 110 may not have an antenna array. Rather, the transmitter 110 may utilize a single antenna element 37. Further, the transmitter 110 may have a smaller amount of memory and may have less computational ability.

In FIG. 2, the transmitter 110 may be transmitting a signal toward the locator device 10. This signal may be referred to as a beacon. In certain embodiments, this beacon is transmitted using a network protocol, such as ZIGBEE® or BLUETOOTH® protocols. In certain embodiments, the transmitter 110 issues a plurality of beacons at a plurality of different frequencies. The transmitter 110 may be offset from the locator device 10 in the azimuth and/or elevation directions. In this particular embodiment, the transmitter 110 is shown as being offset in the azimuth direction. Because of this offset, the signal from the transmitter 110 will reach the antenna elements 36 on the right side of the locator device 10 before it reaches the antenna elements 36 on the left side of the locator device 10. This difference in phase can be used to determine the direction of arrival, shown as θ in FIG. 2.

More specifically, the locator device 10 may utilize the I and Q signals described above to determine the amplitude and phase of the signal arriving at each of the antenna elements 36. Many algorithms are known that compute the direction of arrival based on the phase information obtained from an antenna array.

For example, the multiple signal classification (MUSIC) algorithm utilizes phase information to determine the direction of arrival. The MUSIC algorithm creates a one or two dimensional graph, depending on the configuration of the antenna array, where each peak on the graph represents a direction of arrival for an incoming signal. This one or two dimensional graph may be referred to as a pseudo-spectrum. The MUSIC algorithm calculates a value for each point on the graph. To more clearly define these points, the MUSIC algorithm actually plots the reciprocal of these calculated values, so that the minimum value of the calculated values creates a narrow peak. Thus, the minimum value of any point in the pseudo-spectrum is 0, and there is no maximum value. Stated differently, a peak in the pseudo-spectrum corresponds to the angle of some signal entering the antenna array 35.

One issue with this algorithm may be accuracy. Because of the many errors sources, such as multipath, signal/ sampling noise and numerical inaccuracies, the resulting pseudo-spectrum of a single calculation round does not always produce the correct result.

While this disclosure describes use of the MUSIC algorithm, other algorithms may also be used. For example, the Minimum Variance Distortionless Response (MVDR) beamformer algorithm (also referred to as Capon's beamformer), the Bartlett beamformer algorithm, and variations of the MUSIC algorithm may also be used.

In each of these, the algorithms use different mathematical formulas to calculate the spectrum, but each calculates a spectrum which can be used in the present disclosure.

The present system improves upon the existing algorithms by utilizing data collected multiple times, optionally at a plurality of frequencies. Collecting data from multiple frequencies provides more information about multipath, so that the output of the algorithm is more accurate.

BLUETOOTH® protocol and certain other network protocols utilize a concept referred to as frequency hopping, where the carrier frequency can shift within a predetermined range. These changes in frequency may affect the results of the direction of arrival algorithms. However, the use of frequency hopping is not essential and therefore other protocols, such as ZIGBEE® protocol may also be used.

Figure 3A:
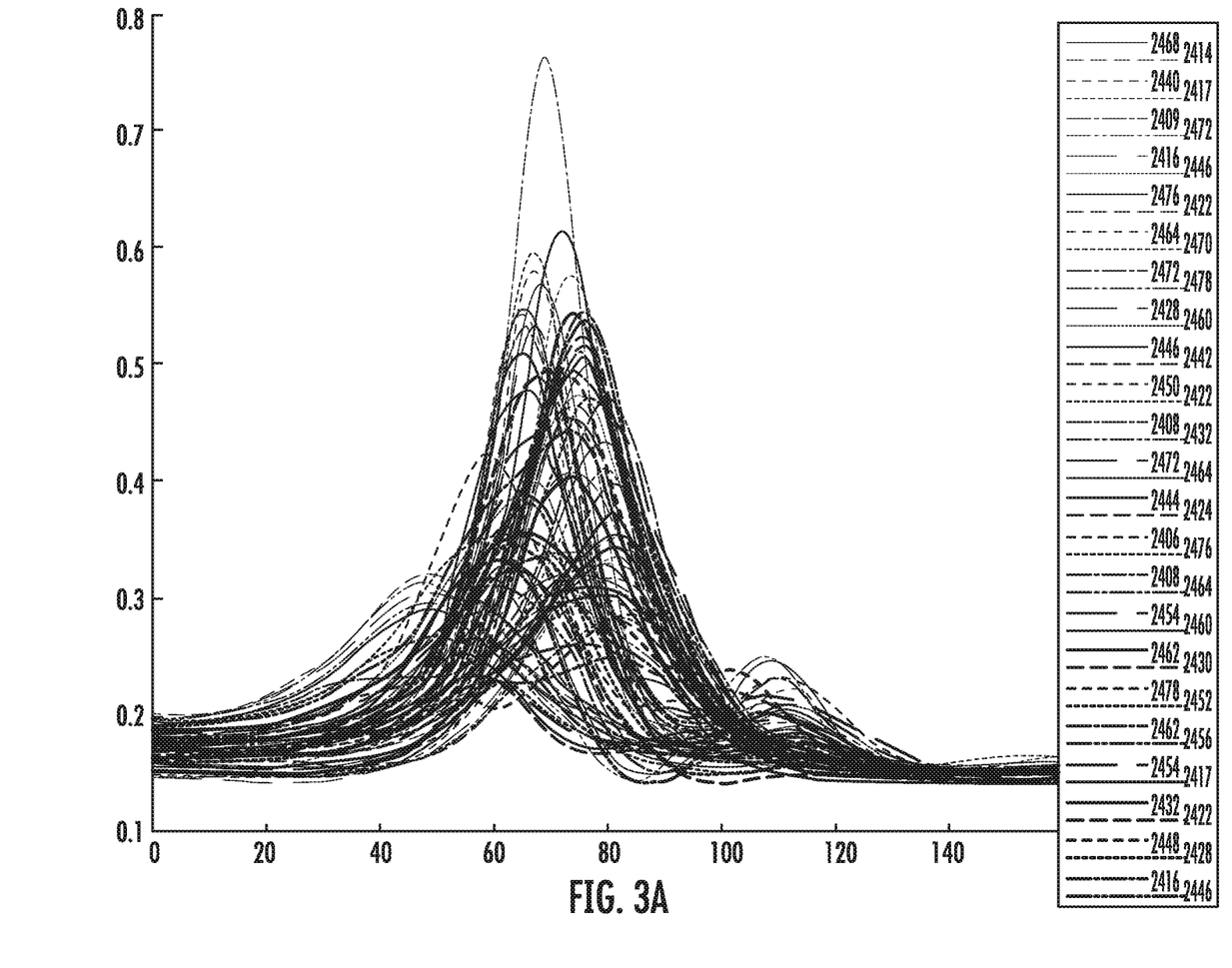
FIG. 3A shows a plurality of pseudo-spectrums.

FIG. 3A shows the pseudo-spectrums collected by the locator device 10 using a direction of arrival algorithm. The horizontal axis is a measure of the angle of arrival, from 0° to 180°. The vertical axis is a measure of the likelihood that this angle is the actual direction of arrival. The same algorithm was performed based on incoming signals that were received at a plurality of frequencies. In this particular example, the frequencies were between 2.406 GHz and 2.478 GHz. Note that the tallest peak is not consistent in each of these pseudo-spectrums. In fact, the peaks vary by as much as about 20°.

The present system attempts to increase the accuracy of this measurement by taking into account all of these pseudo-spectrums. The present system creates a graph that is representative of the product of all measurements taken at each point.

Figure 4:
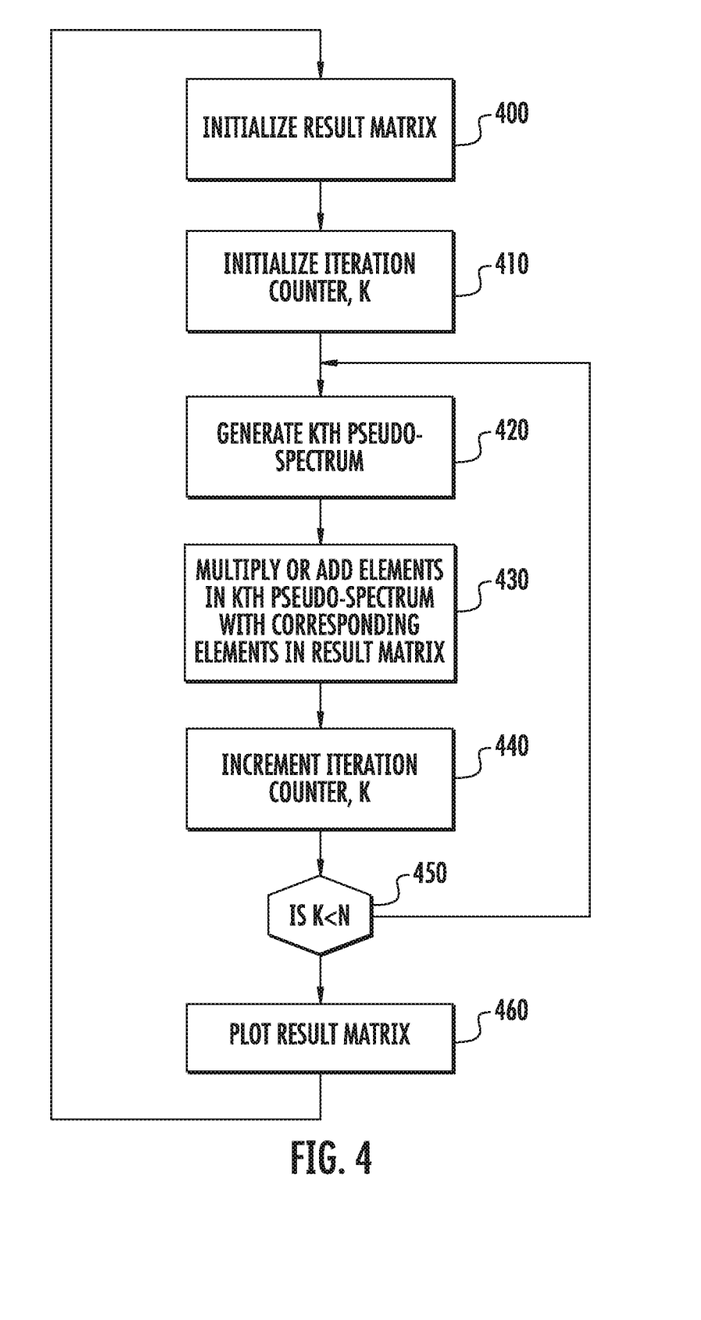
FIG. 4 shows a sequence to generate the graph of FIG. 3B according to one embodiment.

FIG. 4 shows the process performed by the locator device 10 to create this graph. First, as shown in Process 400, every element in a result matrix is initialized with the value 1. The result matrix is either a one dimensional or two dimensional matrix, where the dimensions are angles in orthogonal directions. For example, a one-dimensional result matrix may be used for a linear antenna array and only measure azimuth angles. A two-dimensional result matrix may be used if both azimuth and elevation angles can be calculated by the direction of arrival algorithm. The result matrix is configured to be the same size as the pseudo-spectrum. For example, the pseudo-spectrum may be a one dimensional matrix, where there are 180 values, each corresponding to an angle of azimuth, from 0° to 179° (or −89° to 90°). Alternatively, the result matrix may be a two dimensional matrix of size 360×90. If the antenna array is a three dimensional array, the result matrix may be a two dimensional array of size 360×180. Of course, if the resolution of the pseudo-spectrum is different than 1 value per degree, the result matrix is similarly changed.

Further, the pseudo-spectrum does not have to span the entirety of the range. For example, rather than including 180° of azimuth angles, the pseudo-spectrum may cover only a portion of the azimuth range. Similarly, the entire range of elevation angles does not need to be spanned for a two dimensional pseudo-spectrum. Thus, the term "pseudo-spectrum" denotes any spectrum generated by a direction of arrival or direction of departure algorithm, and does not require that the entire range of azimuth and elevation angles be included in the pseudo-spectrum.

Next, an iteration counter is initialized, as shown in Process 410. The iteration counter is used to track the number of pseudo-spectrums that are calculated.

Then a first pseudo-spectrum (PS$_1$) is generated using a well known algorithm, such as MUSIC, as shown in Process 420. Each one-dimensional pseudo-spectrum covers angles ranging from the minimum azimuth angle to the maximum azimuth angle. Each two-dimensional pseudo-spectrum also covers angles ranging from the minimum elevation angle to the maximum elevation angle. The values of this pseudo-spectrum are then multiplied by the corresponding value in the result matrix, as shown in Process 430. In other words:

Result_Matrix [i,j]=Result_Matrix [i,j]*PS$_1$[i,j] for min_azimuth_angle≤i≤max_azimuth_angle and min_elevation_angle≤j≤max_elevation_angle.

Next, the iteration counter is incremented, as shown in Process 440. If the counter is less than the number of desired iterations, the process is repeated, by transitioning to Process 420. In this case, a second pseudo-spectrum (PS$_2$) is generated using the same algorithm, as shown in Process 420. The values of this pseudo-spectrum are then multiplied by the corresponding value in the result matrix, as shown in Process 430. In other words:

Result_Matrix [i,j]=Result_Matrix [i,j]*PS$_2$[i,j]

This process can be repeated any number of times. For example, N iterations are performed, where N is a value greater than 1. In certain embodiments, at least 5 iterations are performed. In other environments, specifically those with a high degree of multipath noise, up to 20 or more iterations may be performed.

Thus, the result matrix can be defined as:

$$\text{Result\_Matrix}[i, j] = \prod_{k=1}^{N} PS_k[i, j]$$

for min_azimuth_angle≤i≤max_azimuth_angle and min_elevation_angle≤j≤max_elevation_angle.

After N iterations, the peak values are determined, as shown in Process 460. Later, the entire sequence can be repeated by returning to Process 400.

Thus, each element in the result matrix is proportional to the product of all corresponding elements in the N pseudo-spectrums that were calculated. In some embodiments, each element in the result matrix is equal to the product of all corresponding elements in the N pseudo-spectrums.

Figure 3B:
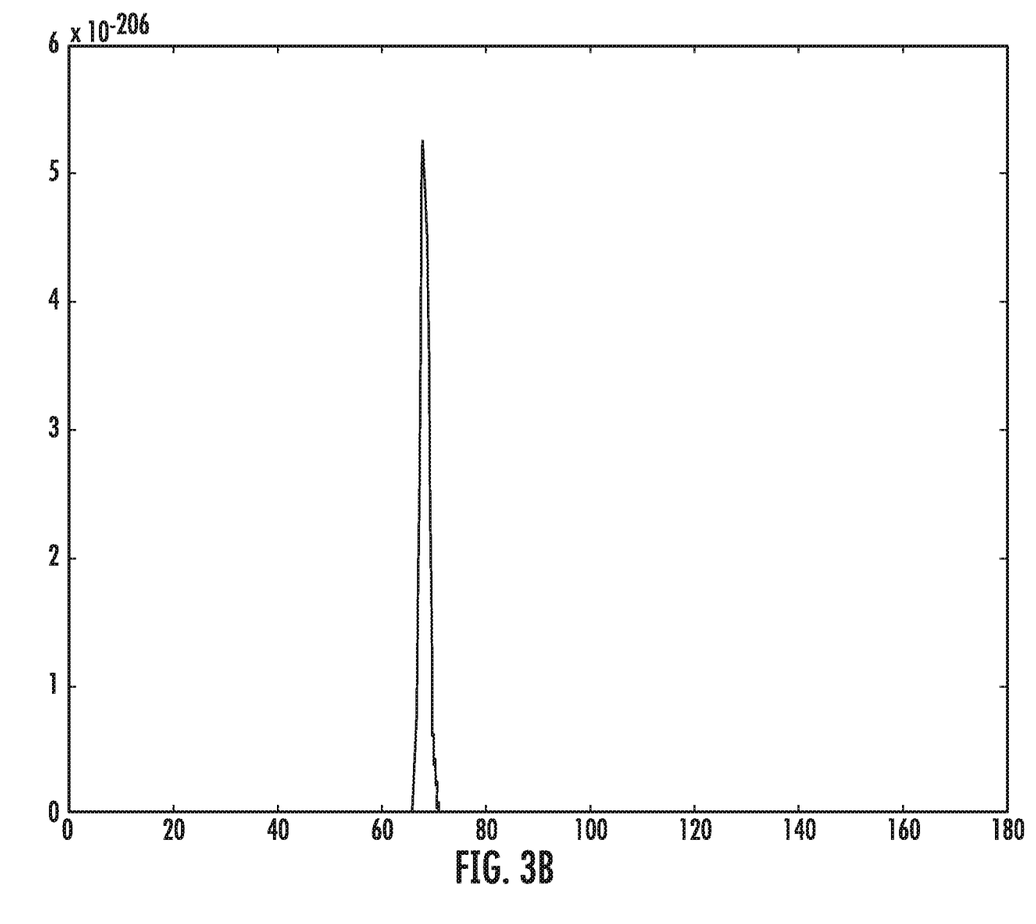
FIG. 3B shows a spectrum created according to one embodiment.

The result of the process described in FIG. 4 is shown in FIG. 3B. Note that the peak is much narrower and clearly shows the direction of arrival with a higher degree of precision. Further, empirical tests show that this peak is very close to the actual direction of arrival.

Figure 8:
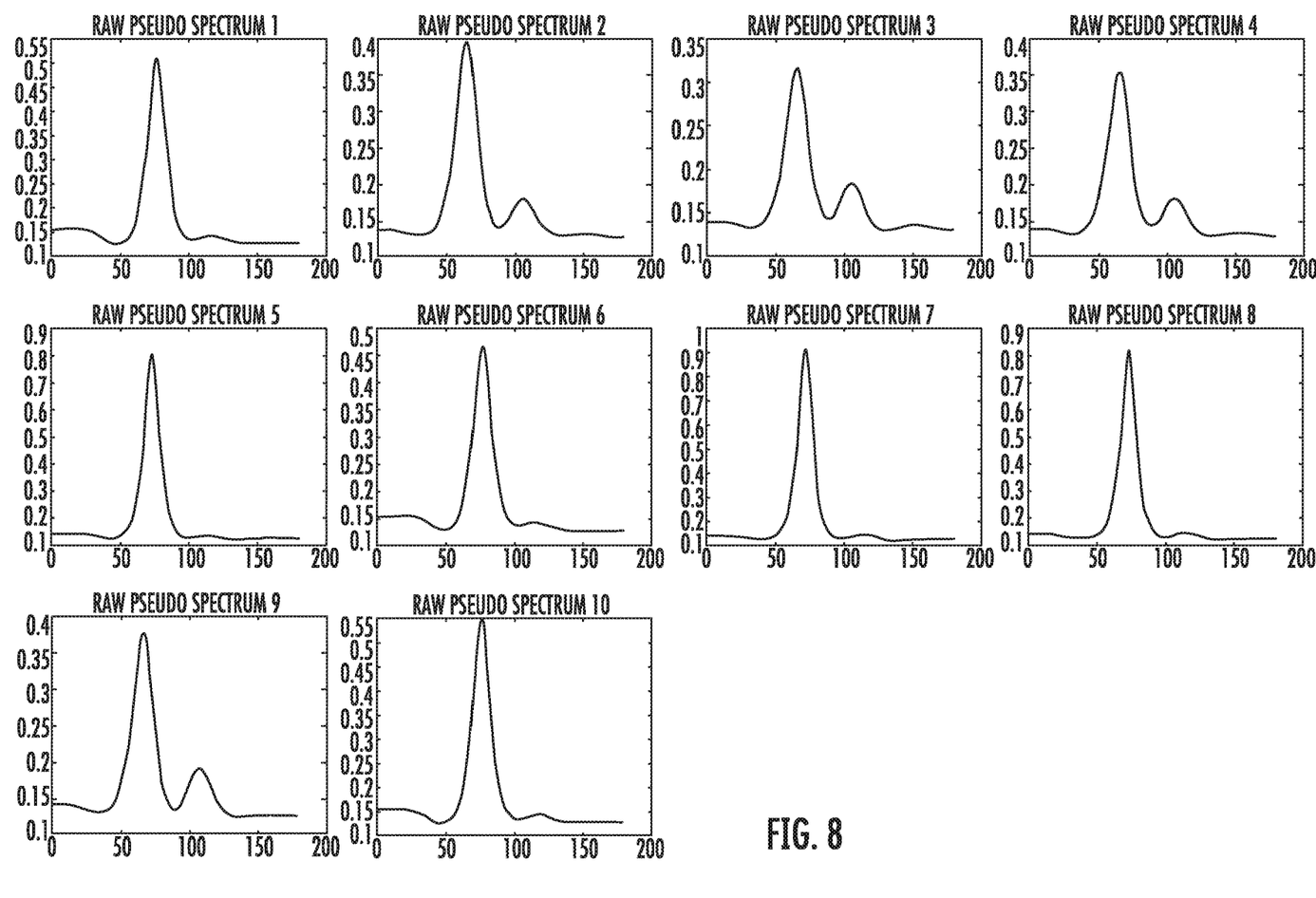
FIG. 8 shows a plurality of pseudo-spectrums generated during one test.

For example, in another test, a transmitter was placed at an azimuth angle of 72° relative to the locator. A plurality of pseudo-spectrums was generated and are shown in FIG. 8. Note that these pseudo-spectrums showed peaks that were between about 66° and 78°.

Figure 9:
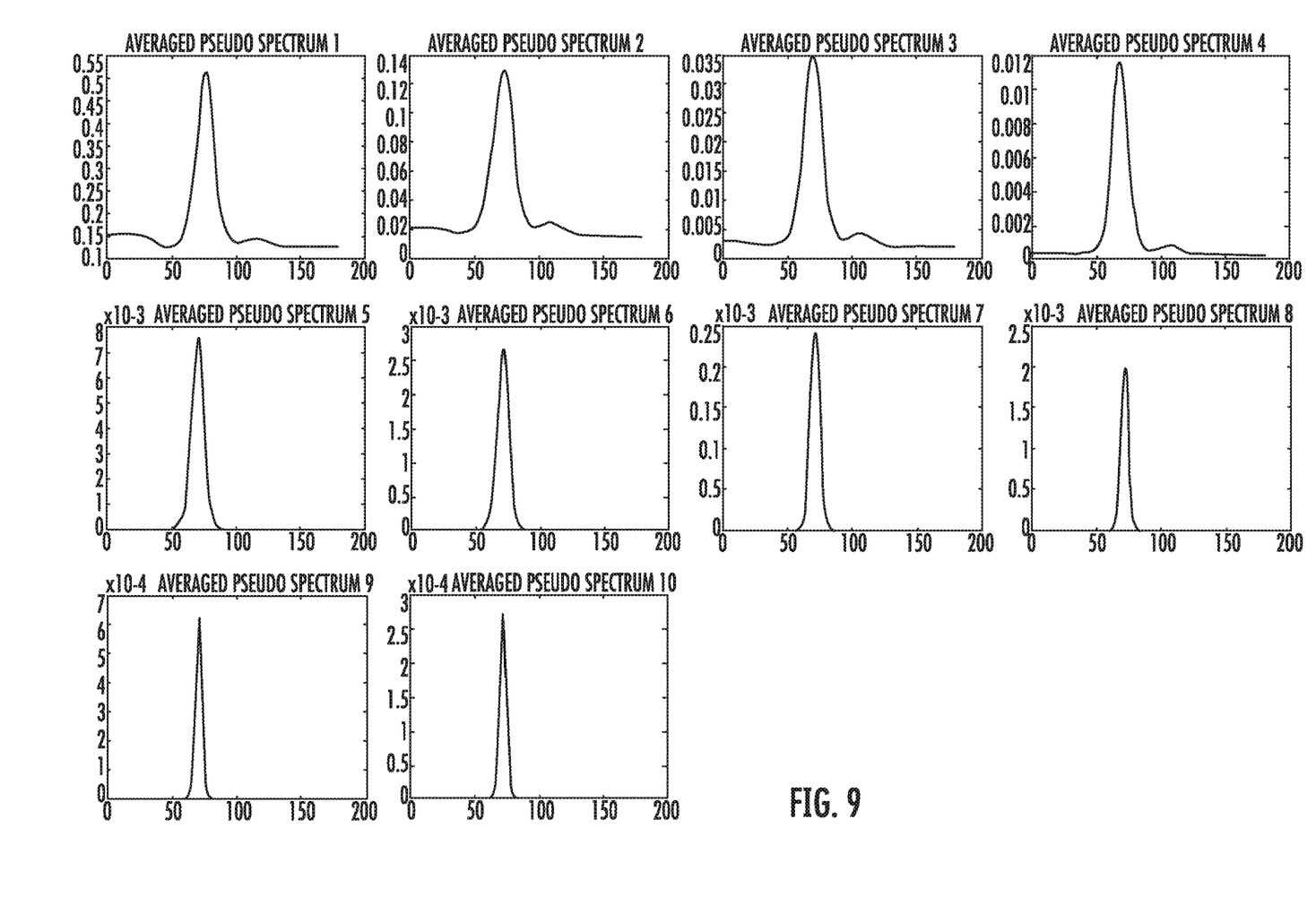
FIG. 9 shows the result matrix as each of the pseudo-spectrums from FIG. 8 is processed.

These pseudo-spectrums were processed using the flowchart shown in FIG. 4. Each spectrum in FIG. 9 is an intermediate result. In other words, the spectrums in FIG. 9 each represent the Result_Matrix as the process shown in FIG. 4 is being executed. Note that the final spectrum in FIG. 9 shows a single narrow peak located at 72°. Thus, the process shown in FIG. 4 can be used to improve the results of the angle of arrival algorithm.

Figure 5:
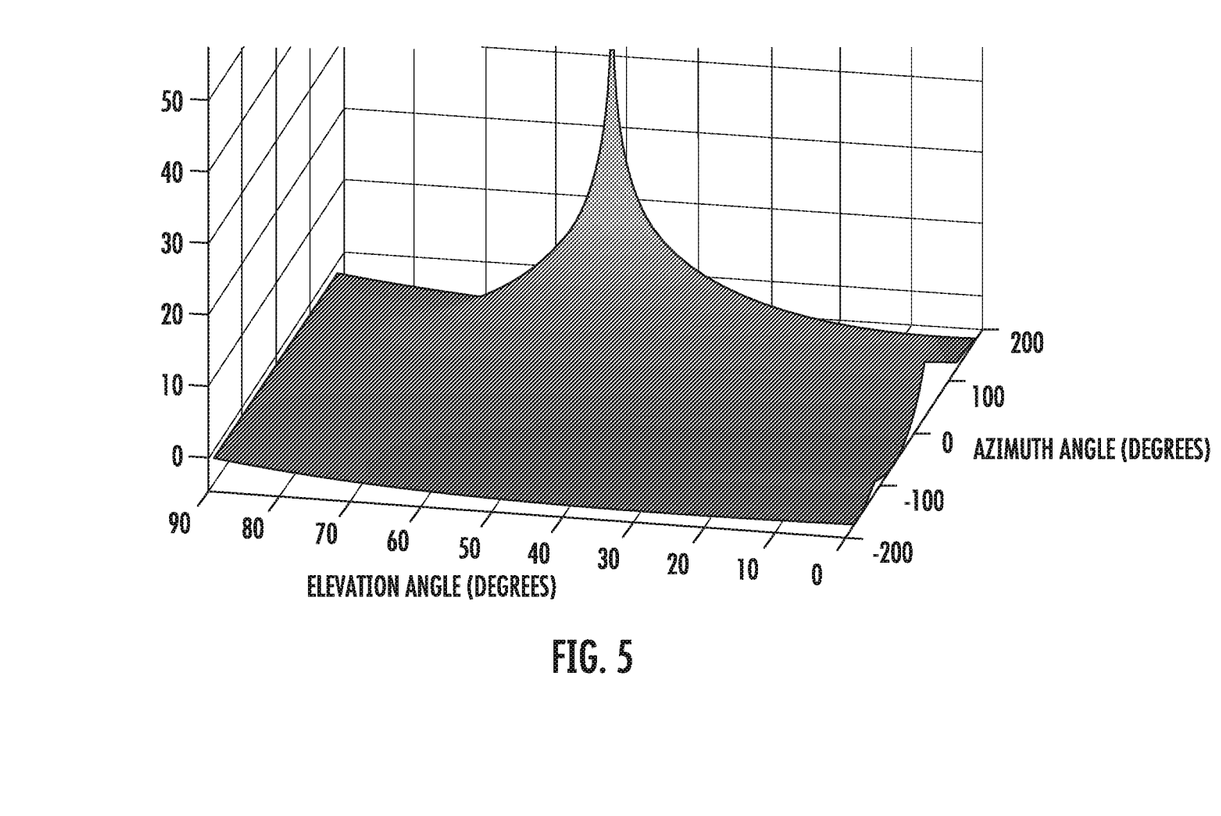
FIG. 5 shows a two-dimensional pseudo-spectrum.

Further, while FIGS. 3A and 3B illustrate a one-dimensional pseudo-spectrum and result matrix, the process described in FIG. 4 is also applicable to two-dimensional pseudo-spectrums, as shown in FIG. 5.

In another embodiment, the results of the plurality of pseudo-spectrums are added together, rather than being multiplied. In this embodiment, Process 430 involves adding the elements in the pseudo-spectrum to the corresponding element in the result matrix. Thus, the result matrix can be defined as:

$$\text{Result\_Matrix}[i, j] = \prod_{k=1}^{N} PS_k[i, j]$$

for min_azimuth_angle≤i≤max_azimuth_angle and min_elevation_angle≤j≤max_elevation_angle.

The results of this averaging also improve the accuracy of the angle of arrival algorithm.

In this embodiment, the amount of noise in the resulting pseudo-spectrum may be quantified. For example, the result matrix is calculated by adding all of the pseudo-spectrums together. The largest value in this result matrix is identified and referred to as the maximum value. Every element in the result matrix is then divided by this maximum value to produce a normalized result matrix. Thus, the maximum element in the normalized result matrix is set to one, while the rest of the elements will be less than 1. All of the values of the normalized result matrix are then added together to form an integral. If the result matrix is a matrix of size N×M, then the maximum value of the integral is N×M; and the minimum value of the integral is 1. The value of the integral may be useful in determining the accuracy of the result matrix, where a smaller integral is indicative of a more accurate result.

While the description above and FIG. 4 describe one embodiment, other embodiments are also possible. For example, rather than calculating the result matrix and later discarding it, as described above, a moving window can be employed. For example, assume that the number of iterations (N) is set to be 20. Sufficient memory to store the 20 pseudo-spectrums is reserved in the locator device 10. Each of the twenty pseudo-spectrums stored in memory and the result matrix is calculated as described above. When the next pseudo-spectrum is calculated, it replaces the first pseudo-spectrum. Stated differently, the result matrix is always the product of the last N pseudo-spectrums.

Figure 6:
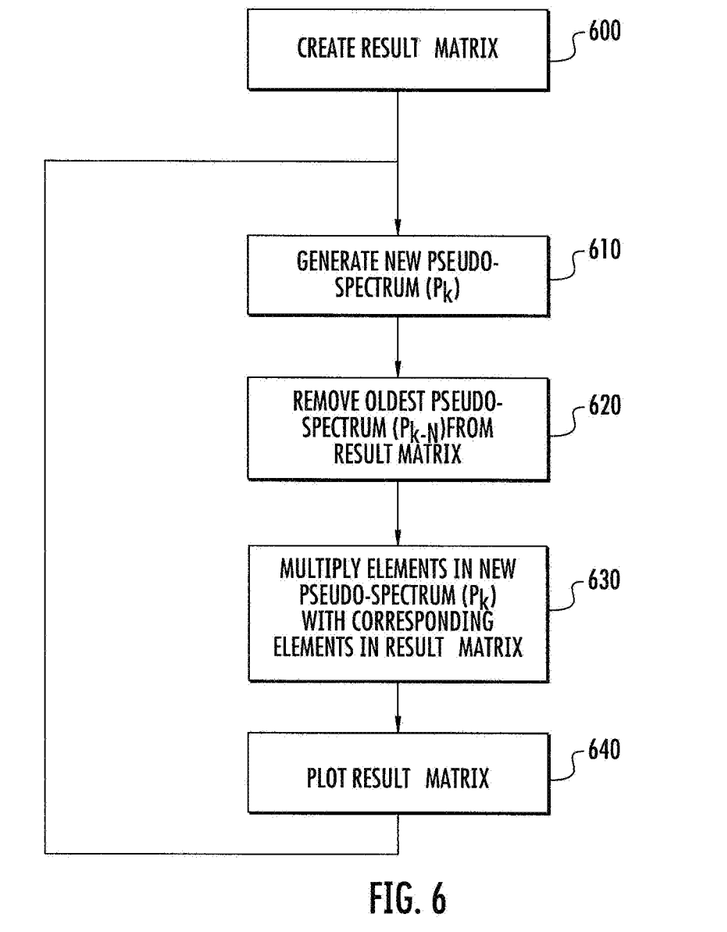
FIG. 6 shows a sequence to generate the graph of FIG. 3B according to another embodiment.

One sequence to perform the rolling window is shown in FIG. 6. First, as shown in Process 600, assume that a result matrix has been created, such as according to the sequence shown in FIG. 4. Next, a new pseudo-spectrum (P$_k$) is generated, as shown in Process 610. The oldest pseudo-spectrum is removed from the result matrix, as shown in Process 620. If N iterations are used to create the result matrix, that P$_{k-N}$ is removed from the result matrix. For example, this may be done by dividing each element in the result matrix by the corresponding element in the oldest pseudo-spectrum (P$_{k-N}$). Next, each element in the result matrix is multiplied by the corresponding element in the new pseudo-spectrum (P$_k$), as shown in Process 630. The new result matrix can then be displayed, as shown in Process 640. Thus, in this embodiment, pseudo-spectrums may be continuously generated and the result matrix is created using a rolling average. This rolling average technique can also be applied if the elements are added together. In this embodiment, Process 620 would subtract each element in the oldest pseudo-spectrum ($P_{k-N}$) from the corresponding element in the result matrix.

In Process 630, each element in the new pseudo-spectrum ($P_k$) is added to the corresponding element in the result matrix.

In yet another embodiment, a measure of quality can be attributed to the result matrix. This can be done by looking at the width of the resulting peak and scattering between the individual pseudo spectrums. For example, the angle of the peaks in each pseudo-spectrum is calculated and the standard deviation of each peak is calculated. Alternatively, if the averaging algorithm uses addition, then the value of the integral, as described above, may be used to determine the quality of the result matrix.

Furthermore, while the present disclosure describes an angle of arrival, it is understood that this technique may be used to improve the accuracy of angle of departure. In this scenario, the device roles are reversed and, referring to FIG. 10, the beacon 1010 includes an antenna array 1035, while the device 1110 has a single antenna 1037. The beacon 1010 transmits a signal and the device 1110 receives the signal. In this embodiment, the device 1110 knows the geometry of the antenna array 1035, switching sequence and switching timings for the beacon 1010. Based on that information, the device 1110 knows which IQ-data sample and which element 1036 of the antenna array 1035 are associated with one another. The antenna array geometry sent by the beacon 1010 is needed by the device 1110 for the angle estimation algorithm, which resides on the device 1110 or on some processing unit in communication with the device 1110.

The angle of arrival or departure may be used for many functions. For example, one angle of arrival locator can be used to locate a beacon. This class of applications may be referred to as wayfinding. For example, the beacon may be a set of car keys or another device that a user needs to find. A user, holding the locator device, may be led to the beacon based on the angle of arrival detected by the locator device. As an example, an automobile may be equipped with BLUETOOTH® protocol devices. A command may be sent by the owner to the automobile disposed in a parking lot to transmit a beacon or sequence of beacons. The locator device, which is carried by the owner, detects the angle of arrival and can lead the owner toward the automobile in the parking lot. In another embodiments, a shopping mall may install beacons at certain locations, such as near exits, certain stores, or the food court. The shopper may use these beacons to guide their way through the mall using a portable locator device. Similarly, the angle of arrival can be used to guide an operator toward an asset in a warehouse or other structure. The locator device may include an indicator that allows the operator to determine the angle of arrival. For example, the locator device may have a visual display that indicates the direction of the beacon. Alternatively, the locator device may have an audio output that informs the user of the direction of the beacon.

When multiple locators are used, the exact location of the transmitter can be determined. This class of applications is referred to as spatial positioning. For example, inside a structure that has multiple locator devices, the exact location of any transmitter may be determined. This may serve to replace GPS in these environments, as GPS positioning requires more power to execute. In one example, an operator may carry a mobile telephone. A plurality of locator devices each determine the angle of arrival for a beacon transmitted by this phone. In one embodiment, these angles of arrival are forwarded to the mobile phone. In another embodiment, these angles of arrival are forwarded to a centralized computational device, which calculates the position of the mobile phone based on all of the received angles of arrival. Thus, the angle of arrival from each locator device may be used by the mobile phone or another device to pinpoint the specific location of the mobile phone. If a plurality of locator devices are employed, three dimensional spatial positioning may also be possible.

Similar functions can be performed using an angle of departure algorithm. For example, as shown in FIG. 10, the user may have a device 1110 that has a single antenna 1037, rather than an antenna array. If the beacons 1010, such as those described above in the shopping mall or warehouse, utilize an antenna array 1035, the user's device 1110 may determine the angle of departure.

The device 1110 may also be able to determine the angle of departure from multiple beacons 1010. If the position of the beacons 1010 is known, the device 1110 may be able to calculate its spatial position from these angles of departure.

In other words, this information can be used in the same manner as angle of arrival information for wayfinding and spatial positioning. Furthermore, the device 1110 may have an indicator to provide an indication of the angle of departure to the user. In other embodiments, the device 1110 may have an indicator to inform the user of its spatial position.

Figure 7:
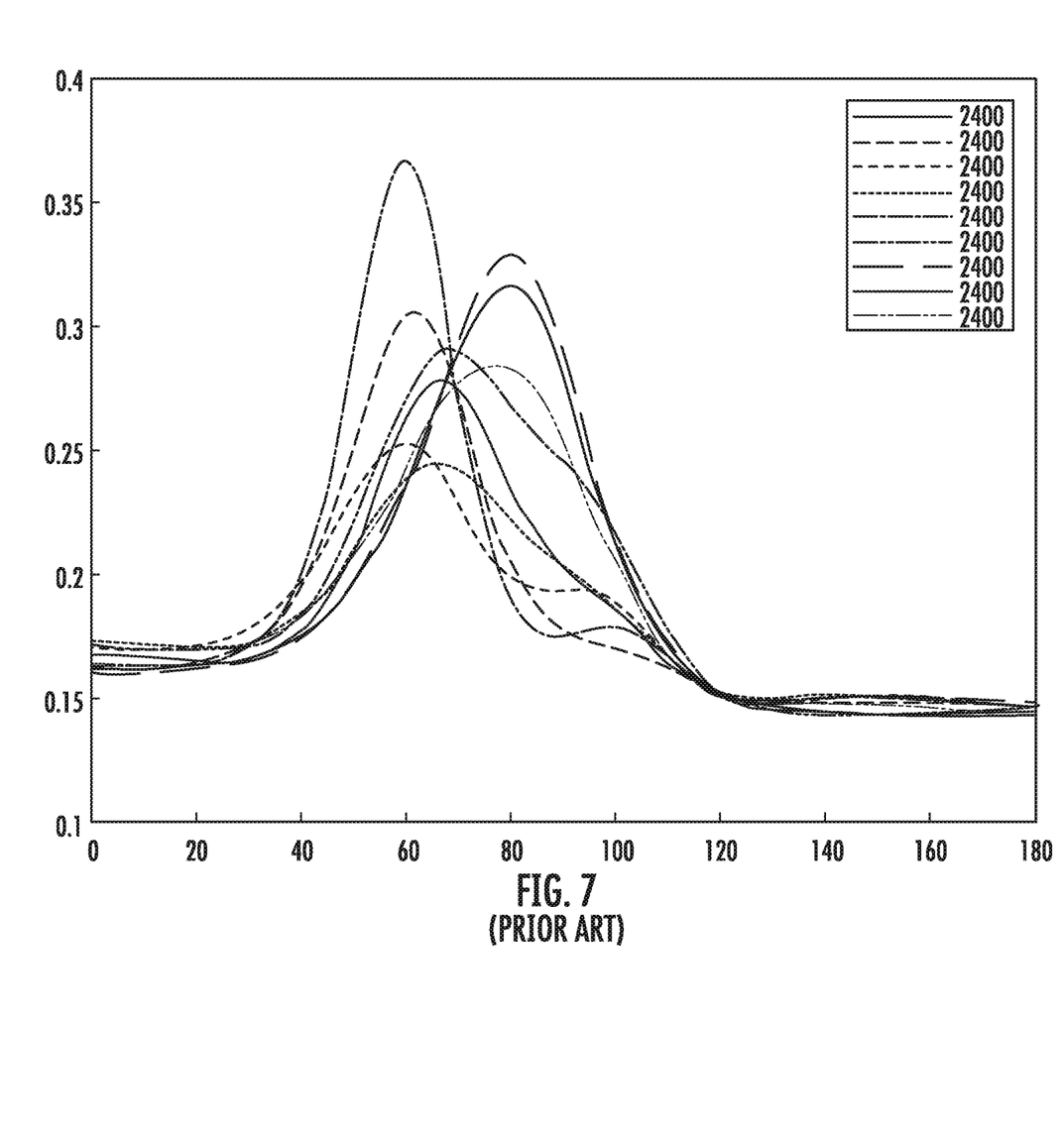
FIG. 7 shows the variation in pseudo-spectrums in a static environment.

The present system has many advantages. First, well known direction of arrival algorithms maybe inaccurate or inconsistent, as shown in FIG. 3A. In fact, FIG. 7 shows the variation in results in a static environment using traditional direction of arrival algorithms. The present system and method results in more accurate results, even in high multi-path environments. Further, this new system and method can be easily implemented and does not require high level of computation.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method of improving the accuracy of an angle of arrival or an angle of departure algorithm, wherein the algorithm is used to determine an angle of arrival or angle of departure of radio frequency signals, comprising:
   executing the angle of arrival or angle of departure algorithm a plurality of times so as to create a plurality of pseudo-spectrums, wherein the pseudo-spectrums comprise one or two dimensional arrays;
   performing a mathematical operation on the plurality of pseudo-spectrums to produce a result matrix; and
   determining the angle of arrival or angle of departure of the radio frequency signals based on the result matrix, wherein the mathematical operation improves the accuracy of the angle of arrival or angle of departure algorithm.

2. The method of claim 1, wherein the mathematical operation comprises adding corresponding elements from each of the plurality of pseudo-spectrums to form the result matrix.

3. The method of claim 2, further comprising determining a measure of quality.

4. The method of claim 3, further comprising:
normalizing the result matrix by dividing each element in the result matrix by the largest value contained in the result matrix to form a normalized result matrix; and
adding all of the elements of the normalized result matrix together to generate an integral;
wherein the integral is indicative of the accuracy of the angle of arrival or angle of departure algorithm.

5. The method of claim 1, wherein the mathematical operation comprises multiplying corresponding elements from each of the plurality of pseudo-spectrums to form the result matrix.

6. The method of claim 1, wherein the plurality of pseudo-spectrums are created based on incoming radio frequency signals acquired at a plurality of different frequencies.

7. The method of claim 6, wherein the incoming radio frequency signals comprise a plurality of beacons, and a transmitter sends the plurality of beacons using a frequency hopping technique.

8. The method of claim 1, wherein the angle of arrival or angle of departure is used to perform wayfinding.

9. The method of claim 1, wherein the angle of arrival or angle of departure is used to perform spatial positioning.

10. The method of claim 1, wherein the angle of arrival or angle of departure algorithm continuously generates pseudo-spectrums and the result matrix is generated using a rolling average.

11. A locator device, comprising:
a one or two dimensional antenna array;
a wireless receiver in communication with the antenna array;
a processing unit; and
a memory device in communication with the processing unit, further comprising instructions, which when executed by the processing unit, enable the locator device to:
generate a plurality of pseudo-spectrums based on incoming signals received by the wireless receiver, using an angle of arrival algorithm;
perform a mathematical operation on the plurality of pseudo-spectrums to create a result matrix; and
determine an angle of arrival from the result matrix, wherein the mathematical operation improves the accuracy of the angle of arrival algorithm.

12. The locator device of claim 11, wherein the mathematical operation comprises adding corresponding elements from each of the plurality of pseudo-spectrums to form the result matrix.

13. The locator device of claim 12, further comprising determining a measure of quality.

14. The locator device of claim 13, further comprising instructions, which when executed by the processing unit, enable the locator device to:
normalize the result matrix by dividing each element in the result matrix by the largest value contained in the result matrix to form a normalized result matrix; and
add all of the elements of the normalized result matrix together to generate an integral;
wherein the integral is indicative of the accuracy of the angle of arrival algorithm.

15. The locator device of claim 11, wherein the mathematical operation comprises multiplying corresponding elements from each of the plurality of pseudo-spectrums to form the result matrix.

16. The locator device of claim 11, wherein the plurality of pseudo-spectrums are generated based on incoming signals acquired at a plurality of different frequencies.

17. The locator device of claim 11, further comprising an indicator to inform an operator of the angle of arrival.

18. A device, comprising:
an antenna;
a wireless receiver in communication with the antenna;
a processing unit; and
a memory device in communication with the processing unit, further comprising instructions, which when executed by the processing unit, enable the device to:
generate a plurality of pseudo-spectrums based on incoming signals received by the wireless receiver, using an angle of departure algorithm;
perform a mathematical operation on the plurality of pseudo-spectrums to create a result matrix; and
determine an angle of departure from the result matrix, wherein the mathematical operation improves the accuracy of the angle of departure algorithm.

19. The device of claim 18, further comprising an indicator to inform an operator of the angle of departure.

20. The device of claim 18, further comprising an indicator to inform an operator of its spatial position.

* * * * *